United States Patent Office 2,935,436
Patented May 3, 1960

2,935,436

METHOD OF MAKING PAPER CONTAINING A STARCH ETHER AND PRODUCT PRODUCED THEREBY

Carlyle G. Caldwell, Plainfield, and Otto B. Wurzburg, Whitehouse Station, N.J., assignors to National Starch and Chemical Corporation, a corporation of Delaware No Drawing. Application May 9, 1957
Serial No. 658,010

11 Claims. (Cl. 162—175)

Our invention relates to a method for making paper, and to the improved paper thus obtained. More specifically, it is our object to provide an additive which may be incorporated with the stock during the manufacture of paper, thereby causing the paper to be characterized by greater strength, improved retention of pigments and dyes, better finish and other desirable properties.

Our invention comprises the addition to paper stock of starch ethers, wherein the substituent radical contains a tertiary amino group. Examples of this type of starch derivative include the dialkyl amino alkyl and the dialkyl amino hydroxyalkyl ethers of starch.

This application is a continuation-in-part of copending application Serial Number 360,818, filed June 10, 1953, by Carlyle G. Caldwell and Otto B. Wurzburg, now Patent No. 2,813,093, patented November 12, 1957, and assigned to the assignee of the present application.

By the term "starch" we mean amylaceous substances such as untreated starch, as well as starch derivatives including dextrinized, hydrolyzed, oxidized, esterified and etherified starches still retaining amylaceous material. The starches may be derived from any sources including corn, wheat, potato, tapioca, waxy maize, sago or rice.

Starch ethers of the above-described type, and having notable effects in improving the quality of paper, can be made by etherifying starch with an etherifying agent selected from the group dialkyl amino alkyl epoxides, dialkyl amino alkyl halides, as well as the corresponding compounds containing aryl groups in addition to the alkyl groups. All of the types of etherifying agents listed here, have the common characteristic of reacting with the starch through an ether linkage, and thereby introducing a tertiary amino radical into the starch.

Representative examples of suitable specific etherification agents for the purpose of making such starch derivatives include b-diethyl amino ethyl chloride, b-dimethyl amino isopropyl chloride, b-dimethyl amino ethyl chloride, 3-dibutyl amino 1,2 epoxypropane, 2-bromo-5-diethyl amino pentane hydrobromide, N-(2,3 epoxypropyl) piperidine and N,N-(2,3 epoxypropyl) methyl aniline. The various halides (e.g., chloro-, bromo-, etc.) can be used interchangeably. In the above reagents, where we have indicated the free amines (e.g., b-diethyl amino ethyl chloride), one can also use the hydrochloride or other salts of these reagents (e.g., b-diethyl amino ethyl chloride hydrochloride). In fact, we ordinarily prefer to use the salts since these are often less toxic and more convenient to handle. The hydrochloride moiety takes no part in the etherification reaction. It will be seen that besides the alkyl, aryl and aralkyl types, the reagents may also include those containing cyclic groups.

Broadly, all of the starch ethers employed in the process of this invention may be described by the following structural formula:

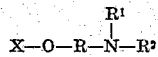

wherein X is starch, R is a radical selected from the group consisting of alkylene and hydroxyalkylene radicals, and each of $R^1$ and $R^2$ is a radical selected from the group consisting of alkyl, aryl and aralkyl radicals. It is our belief that the introduction of a tertiary amino group adds a positive electrical charge to the starch molecule, and this in turn may explain the remarkably increased affinity of these starch derivatives for the negatively charged cellulose in paper beater mixtures. Our invention comprises the addition of such starch derivatives to the paper stock during the manufacture of paper, resulting in the notable improvements already mentioned. The herein described aminoalkylated starches are characterized, among other things, by greater effectiveness in reactions with aldehyde resins and other chemical groups known to be capable of reacting with amines. This is of particular importance where these starch derivatives are used in conjunction with aldehyde resins in the treatment of paper for high wet strength and other improved properties.

Before describing the paper making process of our invention, that is, the employment of the aminoalkylated starch ethers as additives in paper making, we shall indicate some methods whereby the starch derivative may be prepared.

Starch is preferably treated with the etherification reagent (of the type already described) in the presence of an alkaline medium. This may be accomplished by suspending the starch in water, to which has been added (either before or after the addition of starch) sufficient base, such as an alkali metal hydroxide, alkaline earth hydroxide, quaternary ammonium hydroxide, or the like, to maintain the mixture in an alkaline state during the reaction. The required amount of the tertiary amine etherification reagent is then added, agitation being maintained until the desired reaction is complete. Heat may be applied, in order to speed the reaction, since the usual time-temperature relationship appertains.

The proportion of etherification reagent used will vary with the particular reagent chosen (since they naturally vary in reactivity and reaction efficiency) and the degree of substitution desired. Thus, we have obtained substantial improvements in paper quality by using as an additive a starch ether made with as little as 0.5% etherification reagent, based on the weight of the starch, and on the other hand we have successfully employed starch ethers made with as much as 30% etherification reagent.

It is well known that starch which in its natural state is in the form of discrete granules, will in the presence of water and sufficient alkali, undergo gelatinization. The phenomenon of gelatinization involves the swelling, rupture and disintegration of the starch granule, so that it will disperse in water to form a homogeneous hydrated colloidal dispersion, whereas ungelatinized starch granules on the other hand will settle out of water suspension and may be filtered and dried, still retaining their original granule form.

For use in the paper making process, the tertiary aminoalkylated starch ethers may be produced in gelatinized or ungelatinized form.

The advantage of having the derivative in ungelatinized form is that it may be filtered, washed, dried and conveyed to the paper mill in the form of a dry powder.

In order to avoid gelatinization of the starch during the etherification process, in those cases where the degree of alkalinity or heat is such as would ordinarily cause gelatinization to occur, one may add a known gelatinization retarding chemical, such as sodium sulfate, to the starch-alkali-water-etherification reagent mixture. When the amino alkyl starch ether is supplied to the paper mill in ungelatinized form, it will ordinarily be necessary that the starch product be gelatinized, as by cooking in water, before it is added to the paper stock (although it is possible to arrange to add the ungelatinized starch derivative directly to the paper stock, and to apply sufficient heat to the stock to gelatinize the starch product "in situ").

It is also possible to conduct the starch etherification reaction in such a manner that the product will be a gelatinized dispersion of the starch ether in water. This occurs when the alkalinity and/or heat is sufficient to gelatinized the starch. Even if the starch ether is not gelatinized during the reaction, it may be gelatinized or dispersed simply by heating the reaction mass. The aqueous dispersion of the gelatinized starch ether may be added directly to the paper stock, if desired.

By still another variation, the starch ether may be produced in dry, cold water soluble form. This may be accomplished by drying the above-mentioned gelatinized dispersion over revolving heated drums (or other suitable drying means), or one may take an aqueous suspension of the ungelatinized starch ether (with or without prior purification by filtration or centrifuging) and convert it to the cold water soluble form by passing over revolving heated drums. In either case, the resulting dry powder has the advantageous property of dispersing in cold water without the necessity of heat. This means of course that it may be added directly to the paper stock without any pre-cooking being necessary.

It is seen that regardless of which particular physical form of the starch derivative is employed, one is always adding to the paper stock a tertiary amino alkyl ether of starch.

We shall now describe the paper-making process in which the above-mentioned starch derivative is employed.

Broadly, the first step in the paper-making process comprises treating cellulosic material (such as wood) by chemical or mechanical means to free the cellulose fibers from their natural binders, thus obtaining a fibrous pulp. Waste paper or other sources of cellulose are sometimes used to partly or completely replace the wood. The mass resulting from this initial mechanical or chemical treatment is referred to as the "stock." The stock is then processed to prepare it for formation into paper or paperboard, and it is then passed over a moving wire, whereby part of the water drains off, leaving a mat of fibers, commonly referred to as the wet web. The wet web passes from the moving wire to a press section where additional water is removed, thence to a drier section where heat is used to evaporate the remaining water, at which point further treatment may be applied (such as calender sizing, coating, etc.) before the continuous dry sheet is wound on a reel or cut into individual sheets.

The original treatment of the cellulosic material to obtain a pulp, may, as indicated above, be chemical (as in the sulfate, sulfite and soda processes), or may merely involve a mechanical grinding operation, as is customary in the manufacture of pulp for newsprint. The processing of the stock which results from such chemical or mechanical treatment of the cellulose involves essentially a mechanical treatment to disperse, hydrate, fibrillate and to a certain extent to cut the fibers. It is also customary to add to this stock various additives to impart specific properties desired in the final paper. Such additives may include rosin, alum, various resins, latices, starches and fillers.

After the stock has been prepared by admixture with the desired additives, and sometimes by admixture of two or more types of stock, and is in condition for passing over the wire, it is sometimes referred to as the "furnish." However, for the purposes of this description, we use the term "stock" broadly to describe the aqueous cellulosic mass from the time it has been formed into a pulp by the initial mechanical or chemical treatment, up to the point where it passed over the wire. Our use of the term "stock," in the specification and claims, is to be understood in the light of the aforementioned explanation.

Starches are sometimes added to the stock in order to improve the adhesion of the individual fibers to one another in forming the paper mat, and to impart certain improvements to the final paper. However, ordinary starches, and even chemically derivatized starches heretofore used in paper-making, are not entirely satisfactory. Firstly, they are not effectively retained by the cellulose fiber. That is, when added to the stock, ordinary starches to a great extent fail to adhere to the cellulose fibers, but rather tend to come out with the water when the latter is removed from the stock. Naturally, starch which has been thus removed from the fibrous mass does the ultimate paper no good. Secondly, even that portion of ordinary starch which remains in the paper does not perform efficiently in imparting strength.

We have found that a tertiary amino alkyl ether of starch is far more effective than a conventional starch, when added to the stock in the paper-making process. The use of this additive is attended by the following advantages:

(1) The tertiary amino alkyl starch ethers display remarkably greater retention to the cellulose fibers in the stock, as contrasted to ordinary starches. In fact, substantially all of the tertiary amino starch added to paper stock is retained in the final paper, as compared to the relatively large proportion of untreated starch which is lost. These starch ethers are cationic. The amine group, which is an integral part of the starch molecule, imparts a positive charge to the starch moiety, and it has been found that these derivatives, because of their possitive charge, have a special affinity for the cellulose fibers.

(2) Papers containing the starch derivative of this invention are notably stronger, as indicated by bursting strength factors, tensile strength, surface picking strength and fold tests.

(3) The use of the derivative tends to improve the actual formation and finish of the paper.

(4) The starch derivative not only increases the strength of the paper, but it improves the retention of pigments, fillers and various other additives in the paper, and also improves the overall effect of such sizings and coatings as may subsequently be applied to the finished paper.

(5) Because of its improved effectiveness and high retention, one may employ a considerably lower proportion of the tertiary amino alkyl starch ether than would be the case with other starch derivatives or untreated starches, in order to obtain results which are at least equal and often notably superior.

The following examples illustrate various methods of making tertiary amino alkyl starch ethers, as well as their use as additives in the paper-making process. It is understood that these examples are listed merely to illustrate the embodiment of our invention, and not as a limitation upon the scope thereof.

Example I-A

This example illustrates the preparation of a tertiary amino alkyl starch ether by the treatment of starch with b-diethyl amino ethyl chloride hydrochloride, and Example I-B will illustrate the preparation of paper using that starch derivative as an additive.

Four lbs. sodium hydroxide were dissolved in 150 lbs. water, and 50 lbs. sodium sulfate were added. Agitation was continued until the materials were dissolved, and there were then added, with continued agitation, 100 lbs. corn starch. When the suspension was uniform, there was added a solution of 4 lbs. b-diethyl amino ethyl chloride hydrochloride in 25 lbs. water. Agitation was maintained for 24 hours, at which time enough dilute hydrochloric acid solution was added to adjust the pH to approximately 3. The starch product was then filtered, washed thoroughly with water and dried.

The resulting starch ether corresponded to the diagrammatic formula

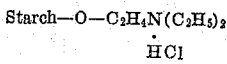

$$\text{Starch—O—C}_2\text{H}_4\text{N}(\text{C}_2\text{H}_5)_2$$
$$\text{HCl}$$

The product was found to be of particular value for use in the paper industry as an additive to paper stock, and the results of its use for that purpose are set forth in following Example I-B.

*Example I-B*

Since the tertiary amino alkylated starch may be applied in the paper making process in various physical modifications, as convenience and circumstances may dictate, this example illustrates various such ways of using the starch product of Example I-A.

A paper stock was prepared by dispersing unbleached sulfate lap pulp for 2 minutes in a laboratory hydropulper at a concentration of 2.2%. This was then refined in a laboratory beater to a freeness of 550, as determined on a Williams Standard Freeness Tester, Model 27 (manufactured by the Williams Apparatus Co., Watertown, N.Y.), using a four gram sample for the freeness test.

At a point which is equivalent to the head box stage in the commercial paper making process, individual portions of the stock were treated with the starch product of Example I-A, as follows:

(a) A portion of the starch derivative of Example I-A was resuspended in water in an amount equal to a starch solids concentration of 1%, and the suspension was heated for 20 minutes at 190–195° F., with agitation, in order to gelatinize the starch. To one portion of the paper stock we added this dispersion, in an amount equal to 1% of the dry starch product based on the anhydrous weight of the fiber in the stock.

(b) A portion of the starch derivative of I-A was resuspended in water and gelatinized by passing through a system of heated tubes at superatmospheric pressure (temperature approximately 252° F.). The gelatinization equipment used was that sold by the Girdler Corporation, Louisville, Ky., under the trade name "Votator." The thus gelatinized dispersion was then dried by passing over revolving drums, heated at a steam pressure of approximately 125 lbs. per square inch. The product thus obtained was the dry, tertiary amino alkyl starch ether in cold water soluble form. To a portion of the paper stock we added this dry starch derivative, in an amount equal to 1% of the starch based on the anhydrous weight of the fiber in the stock.

(c) The procedure of (b) above was repeated, except that the starch suspension was not pregelatinized by passing through the heated tubes ("Votator") but rather was passed directly over the heated drums in order to simultaneously gelatinize and dry the product. As in (b), a cold water soluble product resulted, which was added to a portion of the paper stock in an amount equal to 1% of the starch based on the anhydrous weight of the fiber in the stock.

After making the above additions, sufficient agitation was applied in each case to disperse the additive in the fiber, and hand sheets were then formed on a Williams Standard Sheet Mold (manufactured by the Williams Apparatus Co., Watertown, N.Y.). The bursting strength of each sheet was then tested (i.e., the lbs. per square inch required to burst the paper) in accordance with the procedure described in TAPPI Test Method No. T403m–52. The bursting strength factor was then calculated by dividing the bursting strength by the basis weight of the paper (the basis weight having been calculated on a (24 x 36) 500 ream size). Any increase in the value for the bursting factor is very significant as an indication of increased paper strength.

The sheets were also subjected to a fold test, in accordance with TAPPI Test Method No. T423m–50. This test essentially indicated the number of times a sheet can be double-folded, at a given degree of tension, before breaking. Obviously, here too an increased figure is a measure of increased strength.

The bursting strength factors and the fold test values are given below for paper made with no starch additive, as well as for paper where 1% of untreated corn starch had been added to the stock. Following this are figures for the paper made according to variations (a), (b) and (c) above, showing the percentage increase in bursting strength factors and fold, over the corresponding papers made with no starch additive and with the untreated corn starch additive.

Paper with no additive—bursting strength factor 1.95; fold 340

Paper with untreated starch—bursting strength factor 2.15; fold 450

|  | Percent Increase Over Paper With No Additive | | Percent Increase Over Paper With Untreated Starch Additive | |
| --- | --- | --- | --- | --- |
|  | Burst. Strength Factor | Fold | Burst. Strength Factor | Fold |
| Paper (a) | 23 | 160 | 12 | 100 |
| Paper (b) | 28 | 107 | 16 | 56 |
| Paper (c) | 21 | 94 | 9 | 46 |

It is seen that the addition to the paper stock of a tertiary amino alkyl starch derivative effected significant increases in the bursting strength and fold of the resulting paper.

It will be noted that before gelatinizing the starch derivative, either by cooking an aqueous suspension of the starch or by drum-drying, the starch derivative was filtered, washed and resuspended in water. The reason for this was that it was considered desirable to remove the sodium sulfate, which was present as a gelatinization retarder during the etherification reaction, and which, if present, might have retarded the gelatinization of the starch derivative when it was being prepared for use in (a), (b) or (c) above. However, if in making the product of Example I-A one omits the sodium sulfate, and replaces the four lbs. of sodium hydroxide with approximately three lbs. of calcium hydroxide, gelatinization of the starch during the reaction is avoided, because of the relatively low alkalinity, and yet there is no sodium sulfate to be removed from the reaction mass. Thus the starch derivative in its original reaction liquid may be cooked or drum dried, if desired, without preliminary filtration and washing. The improvement in properties of paper made with the starch derivative prepared in that manner was found to be as great as that shown in the figures (a), (b) and (c) above. Of course, the ungelatinized starch derivative made with calcium hydroxide as the alkali, and in the absence of sodium sulfate or other gelatinization retarder, may also be filtered and washed or centrifuged prior to gelatinization for use in paper, thus achieving the ultimate in purity.

*Example II*

In a variation of Example I-A, the procedure of that example was repeated, except that the final product was not neutralized, but rather left on the alkaline side. Thus the product contained the free amine group rather than the amine salt (the salt having been formed in Example I-A by the neutralization with HCl). The formula of the product of this present example may thus be diagrammatically represented as Starch-O—C$_2$H$_5$N(C$_2$H$_5$)$_2$.

Example I-A was again repeated, except that b-diethyl amino ethyl chloride was used as the etherification reagent.

In both cases, the use of the resulting tertiary amino alkyl starch ethers as additives to paper stock, as described in Example I-B, effected improvements in bursting strength factors and fold.

Example III

In still another variation of Example I-A, the proportions and procedures of that example were repeated, except that in one case we used tapioca starch in place of corn starch; in another case we used corn starch which had been acid-converted to a degree known in the trade as 60 fluidity.

When each of the tertiary amino alkyl starch ethers thus obtained was used as an additive to paper stock, in the manner described in Example I-B, improvements were obtained along the lines therein noted.

Example IV

This example illustrates the use of a tertiary amino alkyl starch ether made by treating an acid-converted starch with b-dimethyl amino isopropyl chloride hydrochloride.

One lb. of potassium hydroxide was dissolved in 150 lbs. water, to which there was then added 100 lbs. of corn starch acid-converted to a degree known in the trade as 60 fluidity. Constant agitation was maintained. When the suspension was uniform, there was added a solution of ½ lb. b-dimethyl amino isopropyl chloride hydrochloride in 10 lbs. water. Agitation was maintained at 90° F. overnight, whereupon the mixture was neutralized with dilute hydrochloric acid, filtered, washed and dried. The product corresponded to the diagrammatic formula

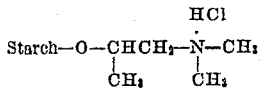

This product was used as an additive to paper stock, in the manner described in Example I-B(a), except that groundwood newsprint stock was used in place of unbleached sulfate, and the stock was beaten only to a point that insured good dispersion. Bursting strength factors were determined in the manner described, and pick (the standard test for surface strength) was determined in accordance with the procedure set forth in TAPPI Test Method No. T459m-48.

| Additive | Percent Additive | Burst. Strength Factor | Pick |
|---|---|---|---|
| None | | 0.3 | 3 |
| Untreated gelatinized potato starch | 1 | 0.37 | 3 |
| Tertiary amino alkyl starch | 0.5 | 0.53 | 5 |

Example V

This example illustrates the use of a starch etherified with a relatively high proportion of etherification reagent, and gelatinized during the course of the etherification reaction.

150 lbs. b-diethyl amino ethyl chloride hydrochloride were dissolved in 3,000 lbs. water. 500 lbs. tapioca starch were added, and when uniform there were added 400 parts of a 25% aqueous solution of sodium hydroxide. Agitation was maintained continuously, for approximately 10 hours. The pH of the dispersion of the gelatinized starch ether was then adjusted to 5.5-6.5 by the addition of dilute hydrochloric acid.

The resulting dispersion was diluted with water to a starch content of about 2%, and added to paper stock, in the amount and manner described in Example I-B. Another portion of the dispersion was dried by passing over heated revolving drums, and the dry product added to paper stock in an amount equivalent to 1% of the starch derivative based on the anhydrous weight of the fiber in the stock. In both cases, improvements in the values for bursting strength factor and fold were observed along the lines described in Example I-B.

Example VI

In this example, an epoxy alkyl amine was used as the etherification reagent in preparing the starch additive. The procedures and proportions of Example I-A were repeated, except that in place of the b-diethyl amino ethyl chloride hydrochloride, we used 3 dibutyl amino 1,2 epoxypropane. In this case etherifiction was accomplished through the epoxy rather than a halide group, and the resulting product was, like that of Example I-A, a starch ether containing a tertiary amine radical within the substituent ether group. Its formula may be represented diagrammatically as

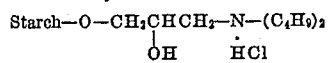

When used as an additive in the paper-making process, as described in Example I-B, improvements in bursting strength factor and fold were noted along the lines therein set forth.

Example VII

This example illustrates the use of a tertiary amino alkyl ether of sago starch. Three lbs. of sodium hydroxide were dissolved in 150 lbs. water and 30 lbs. sodium sulfate were added. To this solution there were added, with constant agitation, 100 lbs. of sago starch. When the suspension was uniform, there was added a solution of 2 lbs. of b-diethyl amino ethyl chloride hydrochloride in 25 lbs. water. The suspension was heated at 120° F., with constant agitation, overnight, at which time enough dilute hydrochloric acid was added to adjust the pH to approximately 3. The starch derivative was then filtered, washed thoroughly with water and dried. The product was gelatinized by heating in water at a starch solids concentration of 1 to 2%, and added to paper stock as described in Example I-B. The paper was tested for bursting strength factor, fold and tensile strength (the latter according to the procedure given in TAPPI Test Method No. T404m-50).

| Additive | Percent Additive | Burst. Strength Factor | Fold | Tensile |
|---|---|---|---|---|
| None | | 2.25 | 300 | 15.2 |
| Untreated gelatinized corn starch | 2 | 2.45 | 420 | 16.8 |
| Tertiary amino alkyl starch | 0.5 | 2.80 | 705 | 18.5 |

Example VIII

In this example, we added 0.1% of the tapioca derivative of Example III, to the beater in the paper-making process. The paper stock in this case contained 5% of filler clay. When the starch derivative was first gelatinized by cooking in water before being added to the stock (as in section (a) of Example I-B) it was found that the resulting improvements in bursting strength and fold were essentially along the lines described in Example I-B. Greater retention of the starch and clay were also noted. When the starch derivative was added in dry, ungelatinized form to the stock, relying on the water in the stock and the heat of the ultimate paper drying operation to swell the starch granules, the improvements were less marked, although still significant.

Example IX

A gelatinized dispersion of a tertiary amino alkyl ether of corn starch was first prepared as follows:

100 lbs. of unmodified corn starch were slurried in 400 lbs. of water. To this was added 5 lbs. of b-diethyl amino ethyl chloride hydrochloride. When the mixture was uniform, 20 lbs. of a 25% aqueous sodium hydroxide solution were added, with constant agitation. The gelatinized mass was agitated for 16 hours at room temperature, after which it was adjusted to pH 4, by the addition of hydrochloric acid. The dispersion was diluted with water to a starch concentration of 1%, and employed in the following tests.

A paper stock was prepared as described in Example I-B, and hand sheets were made in the manner therein described, except that in place of the starch additives employed in Example I-B, we added, to one portion of the stock, the above-described dispersion of starch derivative, in an amount equivalent to 0.5% starch solids, based on the anhydrous weight of the fiber. Another portion of the stock was made into paper, with no additive, and to a third portion of the stock we added 0.5%, based on the fiber, of an untreated gelatinized potato starch. Potato starch was used for comparison because it is extensively employed as a paper additive. Bursting strength factors and fold values were calculated, as previously described, with the following results:

Paper with no additive: Bursting strength factor 2.78; fold 323

Paper with potato starch additive: Bursting strength factor 2.86; fold 430

Paper with aminoalkylated starch derivative: Bursting strength factor 3.03; fold 552

It is seen that the paper made with the starch derivative of this example had a bursting strength factor 9% higher than that made with no additive, and a fold test value that was 71% higher. Significant increases are also noted over the values for paper made with an untreated starch additive.

*Example X*

In order to indicate the effectiveness of tertiary amino alkyl starch ether in improving pigment retention and pick test in paper, we used a starch derivative prepared as follows:

10 lbs. of corn starch were suspended in 90 lbs. of water. To this was added ¾ lb. of slaked lime, and after agitating a half hour one lb. of b-diethyl amino ethyl chloride hydrochloride was added. The mixture was then cooked for 20 minutes, during which period the starch was etherified and of course gelatinized.

The dispersion was cooled to 30° C., adjusted to 3.0 pH, and diluted with water to a starch solids concentration of 1%.

A paper stock was prepared, consisting of 45% bleached sulfite, 45% ground wood and 10% filler clay, the freeness being 190. To various portions of the stock there were added either unmodified corn starch or varying proportions of the above-described starch derivative. Hand sheets were formed as described in Example I-B.

Knowing the amount of filler clay that was originally added to the stock, the percent that remained in the paper was easily calculated. Also, the paper was subjected to the standard pick test for surface strength, in accordance with the procedure outlined in TAPPI Test Method No. T459m-48. These tests were run on paper made with 0.5%, 1% and 2%, respectively, of the starch ether (based on the anhydrous weight of the fiber), as well as on a paper containing 2% of gelatinized unmodified corn starch, and on one containing no starch additive:

| Additive | Percent Retention of Clay Filler | Pick |
| --- | --- | --- |
| None | 16.5 | 10 |
| 2% unmodified starch | 20.1 | 10 |
| 0.5% starch derivative | 41.1 | 11 |
| 1.0% starch derivative | 46.5 | 11 |
| 2.0% starch derivative | 50.0 | 12 |

*Example XI*

This example illustrates the effectiveness of the tertiary amino alkyl starch ether in retention of dyestuffs in paper.

A bleached sulfite lap pulp was prepared, containing 0.05% of a blue dye, sold by E. I. du Pont de Nemours & Co., under the trade designation "Halopont Blue RNM." The pulp was beaten to a freeness of 500. To one portion of the stock there was added 2% gelatinized, unmodified corn starch, and to another portion there was added 0.5% of the cold water soluble amino alkyl starch ether of paragraph (c) of Example I-B (in both cases these figures represent starch solids, based on the weight of the anhydrous fiber). To a third portion of stock no additive was added. Hand sheets were prepared by the method described in Example I-B. The color of the sheets was then noted.

| Additive | Color |
| --- | --- |
| None | No blue color. |
| 2% unmodified starch | Do. |
| 0.5% starch derivative | Deep blue color. |

It is seen that even though the starch ether was employed in an amount which was only one quarter as great as the amount of unmodified starch, the former resulted in excellent dyestuff retention, as indicated by the deep blue color of the paper, whereas the unmodified starch was totally ineffective.

*Example XII*

This example illustrates the use of a tertiary amino alkyl starch ether of very high substitution.

200 lbs. of unmodified corn starch were slurried in 600 lbs. of water and there were added 170 lbs. of b-diethyl amino ethyl chloride hydrochloride dissolved in 200 lbs. water. 400 lbs. of a 25% aqueous sodium hydroxide solution were then added, with agitation. After six hours agitation the reaction mass was neutralized with dilute hydrochloric acid to pH 3. The material was then precipitated in excess ethyl alcohol, filtered, washed with additional alcohol, and dried under vacuum. The product was a cold water soluble tertiary amino alkyl starch.

An unbleached kraft stock was prepared to a Williams freeness of 560, and to a portion of this stock there was added 0.5% of the above starch derivative (starch weight based on the anhydrous weight of the fiber). To another portion of the stock there was added 0.5% of an unmodified gelatinized corn starch. A third portion of the stock was left with no additive. Hand sheets were then formed, in the manner described in Example I-B. The sheets were tested to determine the bursting strength factor and fold, by the procedure outlined in Example I-B.

| Additive | Bursting Strength Factor | Fold |
| --- | --- | --- |
| None | 2.89 | 213 |
| Unmodified starch | 2.94 | 225 |
| Aminoalkylated starch | 3.31 | 297 |

It is seen that paper made with the aminoalkylated starch showed a bursting strength factor 14.5% greater than paper with no additive, and 12.5% greater than paper employing an unmodified starch. Similarly the fold was 39.4% higher than a paper made with no additive, and 32% higher than a paper wherein an unmodified starch was employed.

*Example XIII*

This example illustrates the use of a tertiary amino alkyl ether of starch, wherein the starch had also been subjected to treatment with other chemical groups to impart specifically desired properties.

100 lbs. of corn starch were slurried in 150 lbs. water. To this was added 4 lbs. of slaked lime and 0.25 lb. of b-diethyl amino ethyl chloride hydrochloride. The mixture was agitated overnight at 65°–75° F., acidified to pH 3, filtered, washed and resuspended in 100 lbs. water. The suspension was then adjusted to pH 8.0, and there was added 2% (based on the starch) of acetic anhydride, over a two hour period. During this period the pH was maintained at approximately 8.0 by additions of a 2½% aqueous solution of sodium hydroxide. After all of the acetic anhydride had been added and reacted, the suspension was adjusted to pH 8, centrifuged, and the thus separated starch derivative was resuspended in water and passed over heated drums to produce a dry, gelatinized, cold water soluble product.

The acetic anhydride treatment was for the purpose of introducing acetyl branches into the starch molecule, and thus improve the viscosity stability of aqueous dispersions of the derivative.

To the unbleached kraft stock described in Example XII there was added 0.5% of this starch derivative (starch weight based on the anhydrous weight of the fiber). To another portion of the stock there was added 0.5% of unmodified, gelatinized corn starch. A third portion of the stock was left with no additive. Values for bursting strength factor and fold were determined in the manner previously described.

| Additive | Bursting Strength Factor | Fold |
| --- | --- | --- |
| None | 2.89 | 213 |
| Unmodified starch | 2.94 | 225 |
| Starch derivative | 3.22 | 320 |

It will be noted that paper made with the starch derivative showed a bursting strength factor 11.4% higher than that made with no additive, and 9.5% higher than paper containing an unmodified starch. Similarly the fold value was 50% higher than a paper containing no additive, and 42% greater than in the case of a paper made with the unmodified starch additive.

*Example XIV*

The purpose of this example is to illustrate the greater effectiveness of tertiary amino alkyl starch ethers as compared even to chemically modified starches of the type heretofore sometimes used. In this case we compared the amino alkyl starch of Example I-B (section (a)) with a hydroxyethyl ether of corn starch containing 3.4% hydroxyethyl groups.

To bleached sulfite lap pulp stock, beaten to a Williams freeness of 400, there were added, in one case, 1% of the above-mentioned hydroxyethyl starch ether (based on the anhydrous fiber); to another portion of the stock we added 2% of the hydroxyethyl ether; to a third portion we added 1% (dry basis) of the tertiary amino alkyl starch dispersion of Example I-B (section (a)). Another portion of the stock was left with no additive.

Hand sheets were made up, in the manner described in Example I-B, and they were tested for bursting strength and fold.

| Additive | Bursting Strength Factor | Fold |
| --- | --- | --- |
| None | 2.01 | 394 |
| 1% hydroxyethyl starch | 2.11 | 580 |
| 2% hydroxyethyl starch | 2.20 | 722 |
| 1% aminoalkylated starch | 2.64 | 912 |

It is seen from the above values that while hydroxyethylated starch does improve the bursting strength and fold, the use of only 1% of the tertiary amino alkyl starch derivative results in a bursting strength factor 20% greater and a fold 26% greater than a paper made with twice as much of the hydroxyethyl ether.

*Example XV*

This example illustrates the use of varying amounts of a tertiary amino alkyl starch in a paper stock containing a rosin size and alum.

A bleached kraft stock was prepared with a 1% rosin size, pH adjusted to 4.5, and having a Williams freeness of 630. To one portion of the stock no starch additive was added; to other portions we added, in the quantities (based on the anhydrous fiber) noted below, an aminoalkylated starch prepared as indicated in Example I-B, section (c)), except that b-dimethyl amino isopropyl chloride hydrochloride was used as the reagent in place of the b-diethyl amino ethyl chloride hydrochloride. Hand sheets were prepared as described in Example I-B, and tested, as previously described, for bursting strength factor, fold and tensile strength. The tensile strength represents essentially the pounds required to break a paper specimen of a given width, and the test was conducted in accordance with TAPPI Method No. T404m-50.

| Additive | Bursting Strength Factor | Fold | Tensile |
| --- | --- | --- | --- |
| None | 2.23 | 126 | 13.1 |
| 0.1% starch derivative | 2.35 | 151 | 13.6 |
| 0.25% starch derivative | 2.46 | 191 | 14.6 |
| 0.75% starch derivative | 2.78 | 317 | 16.8 |
| 1.5% starch derivative | 3.0 | 392 | 18.4 |
| 3.0% starch derivative | 3.20 | 420 | 19.5 |

The improvement resulting from even small amounts of the starch additive is obvious from the above figures, and it is seen that the improvement becomes more marked as larger proportions are used.

*Example XVI*

This example illustrates the use of a tertiary amino alkyl ether of potato starch, and also illustrates the use of a derivative formed by reacting a hydroxyethyl starch with a tertiary amine etherifying reagent. In some cases one may prefer to use as the raw material for the etherification a starch base which has previously been substituted with other chemical groups in order to achieve specific properties.

The starch product of Example I-B (section (c)) was prepared, except that in one case we used potato starch in place of corn starch and 2% b-diethyl amino ethyl chloride hydrochloride instead of 4%, and in another case we used a corn starch derivative containing 1½% hydroxyethyl ether groups, reacting this with 2% of the b-diethyl amino ethyl chloride hydrochloride.

To portions of an unbleached kraft stock, beaten to a freeness of 560, we added 0.5% (based on the anhydrous weight of the fiber) of gelatinized unmodified potato starch, gelatinized hydroxyethyl corn starch (1½% substitution), and the above-mentioned amino alkyl derivatives of potato starch and of hydroxyethyl corn starch, respectively. Hand sheets were prepared in the manner previously described, and these were tested for bursting strength.

| Additive | Bursting Strength Factor |
| --- | --- |
| None | 2.46 |
| Gelatinized potato starch | 2.63 |
| Gelatinized hydroxyethyl corn starch | 2.60 |
| Aminoalkylated potato starch | 2.96 |
| Aminoalkylated hydroxyethyl corn starch | 2.86 |

*Example XVII*

The purpose of this example is to illustrate the high degree of starch retention in the case of the tertiary amino derivatives, as well as the greater effectiveness of these derivatives, as compared to unmodified starches, at approximately equal concentrations in the sheet.

A stock was prepared of bleached sulfite lap pulp at a freeness of 550, as described in Example I-B. To portions of this stock, during the beating cycle, were added gelatinized unmodified corn starch and the amine starch derivative of Example I–B (section (a)), in the amounts indicated below (the amounts being based on the anhydrous weight of the fiber). Hand sheets were prepared, and tested.

| Additive | Amount Added to Stock | Amount Retained in Sheet (Based on Amount Added) | Bursting Strength Factor |
|---|---|---|---|
| | Percent | Percent | |
| None | | | 1.25 |
| Aminoalkylated starch | 0.25 | 100 | 1.50 |
| Do | 0.5 | 100 | 1.68 |
| Do | 1.0 | 99 | 1.85 |
| Unmodified corn starch | 1.0 | 60 | 1.45 |
| Do | 2.0 | 50 | 1.65 |

It is noted from the above that the percent of aminoalkylated starch retained is twice as high as in the case of the unmodified starch, meaning that one would have to add twice as much of the unmodified starch in order to obtain a sheet with approximately the same starch content. Nevertheless, the bursting strength factor is substantially greater for a paper made with the amine derivative than for one made with twice as much of the unmodified starch.

*Example XVIII*

This example illustrates the application of tertiary amino alkyl starch derivatives at relatively high concentrations, and particularly indicates their effect in aiding retention of additives (in this case, a synthetic latex).

Under actual plant conditions, a paper stock was prepared, consisting of waste papers and 10% styrene-butadiene latex, based on the weight of dry fiber. The pH of the stock was 5.5. To portions of this stock were added varying quantities of the starch derivative of Example I–B, (section (c)). The resulting paper, which had a basis weight of 50 lbs. per 500 square feet, was tested for tensile strength, by a modification of TAPPI Method No. T404m–50. The paper was also tested for tear (the force required to tear a sheet), in accordance with the procedure outlined in TAPPI Test No. T414m–49. The results follow:

| Additive | Tensile | Tear | Percent Retention of Latex in Paper |
|---|---|---|---|
| None | 60 | 15 | 60 |
| 3% Starch Derivative | 72 | 31 | 85–90 |
| 5% Starch Derivative | 78 | 40 | 90–95 |
| 10% Starch Derivative | 83 | 44 | 95–100 |

It is seen from the above that the addition of the tertiary amine starch derivative not only improves the strength of paper (as evidenced by the tensile and tear figures), but exerts a remarkable influence in retaining other additives, such as latex, in the paper.

*Example XIX*

This example illustrates the effectiveness of the cold water soluble tertiary amino alkyl starch ether of Example I–B (section (c)) when used as a replacement for gelatinized potato starch under plant conditions.

The paper machine in this case was producing 8600 lbs. per hour of 45 lb. offset based stock, composed of 60% hardwood kraft and 40% sulfite, with 5% filler clay on the weight of the fiber and 60 lbs. of alum per ton. In this process, 25% of offset broke was being returned to the mixing chest for blending with this furnish. Gelatinized potato starch had been added at a rate of 42 lbs. per ton. In place of the potato starch we added the tertiary amine starch, at the mixing chest, at the rate of 20 lbs. per ton. The paper was tested for tear, pick and burst, in the manner previously described, and also analyzed to determine the degree of retention of filler clay. The average values follow:

| Additive | Basis Weight | Tear | | Pick | | Percent Filler | Burst |
|---|---|---|---|---|---|---|---|
| | | Machine Direction | Cross Direction | Felt | Wire | | |
| Potato Starch | 45.5 | 33 | 34 | 11 | 12 | 4.0 | 21.5 |
| Amine Starch | 45 | 34 | 36 | 12 | 13 | 6.3 | 23.0 |

It is seen from the above that although the tertiary amino alkyl derivative was used in an amount less than half that of the potato starch, the former resulted in a paper at least as good as that made with the potato starch, and in fact showed improved burst strength and filler retention. When an attempt was made to reduce the amount of potato starch below the 42 lbs. per ton indicated above, there was an immediate loss in strength characteristics, in both pick and burst values.

*Example XX*

Example I–A was repeated, using the same materials, proportions and procedures, except that in place of the b-diethyl amino ethyl chloride hydrochloride, we used, in one case, 2-bromo-5-diethyl amino pentane hydrobromide; in three other cases we used, respectively, dioctyl amino ethyl chloride hydrochloride, N-(2,3 epoxypropyl) piperidine and N,N-(2,3 epoxypropyl) methyl aniline. When the various amino alkyl starch derivatives were added to paper stock in the manner described in Example I–B, the resulting paper was characterized by improved bursting strength and fold along the lines set forth in that example.

It is seen, from the various examples herein given, that as little as 0.1% of the tertiary amino alkyl starch, based on the anhydrous weight of the fiber in the stock, has proven effective, and on the other hand quantities as high as 10% have been successfully employed. There is no reason to regard 10% as the upper limit of effectiveness, but from the practical point of view one would not ordinarily need to use more than that. The particular amount of the starch additive to be used in any given case will depend upon a number of factors, including the type of paper stock involved, the nature and amount of other additives, if any, the ultimate use of the paper, and especially the properties desired in the paper. If one is interested only in improving retention of dyestuffs one may need one quantity; if one wishes better retention of fairly large proportions of latex or other resinous additives, the required quantity of starch derivatives may be different. The determination of the quantity to be used in any given case is a matter of simple experimentation, well within the skill of the practitioner in the art.

In summary, our invention comprises a method for making paper wherein a tertiary amino alkyl ether of starch is added to the paper stock; a paper stock containing such a starch derivative; and a paper containing such a starch derivative as an internal component thereof. By "internal component" we refer to the state of the starch derivative being relatively homogeneously dispersed throughout the mass of the paper, as contrasted to a mere superficial coating on the surface of the paper. While we have herein listed various representative examples of the use of the tertiary amino alkyl starch ethers in paper manufacture, it is understood that many variations in materials, proportions and procedures are possible, without departing from the scope of this invention, as defined in the following claims.

We claim:

1. A paper containing homogeneously dispersed throughout the cellulosic fibers thereof an etherification product having the following structural formula:

$$\text{Starch}-\text{O}-\text{R}-\overset{\overset{\displaystyle R^1}{|}}{\text{N}}-R^2$$

wherein R is a radical selected from the group consisting of alkylene and hydroxyalkylene radicals, and each of $R^1$ and $R^2$ is a radical selected from the group consisting of alkyl, aryl and aralkyl radicals.

2. A paper containing homogeneously dispersed throughout the cellulosic fibers thereof from 0.1% to 10%, based on the anhydrous weight of the fibers, of an etherification product having the following structural formula:

$$\text{Starch}-\text{O}-\text{R}-\overset{\overset{\displaystyle R^1}{|}}{\text{N}}-R^2$$

wherein R is a radical selected from the group consisting of alkylene and hydroxyalkylene radicals, and each of $R^1$ and $R^2$ is a radical selected from the group consisting of alkyl, aryl and aralkyl radicals.

3. The paper of claim 2, in which the etherification product is one resulting from the reaction of starch in an alkaline medium with a dialkyl amino alkyl halide.

4. The paper of claim 2, in which the etherification product is one resulting from the reaction of starch in an alkaline medium with a dialkyl amino alkyl epoxide.

5. In a method for making paper, the step which comprises adding to the stock, at any stage prior to passing the stock onto the wire, an etherification product having the following structural formula:

$$\text{Starch}-\text{O}-\text{R}-\overset{\overset{\displaystyle R^1}{|}}{\text{N}}-R^2$$

wherein R is a radical selected from the group consisting of alkylene and hydroxyalkylene radicals, and each of $R^1$ and $R^2$ is a radical selected from the group consisting of alkyl, aryl and aralkyl radicals.

6. The method of claim 5, in which the etherification product in ungelatinized form is purified and then gelatinized by heating in water before being added to the paper stock.

7. The method of claim 5, in which the etherification product is in dry, cold water soluble form when added to the paper stock.

8. The method of claim 5, in which the etherification product, when added to the paper stock, is in the form of a gelatinized dispersion in the original etherification reaction mass.

9. In a method for making paper, the step which comprises adding to the stock, at any stage prior to passing the stock onto the wire, from 0.1% to 10% based on the anhydrous weight of the fiber in the stock of an etherification product having the following structural formula:

$$\text{Starch}-\text{O}-\text{R}-\overset{\overset{\displaystyle R^1}{|}}{\text{N}}-R^2$$

wherein R is a radical selected from the group consisting of alkylene and hydroxalkylene radicals, and each of $R^1$ and $R^2$ is a radical selected from the group consisting of alkyl, aryl and aralkyl radicals.

10. The method of claim 9, in which the etherification product is one resulting from the reaction of starch in an alkaline medium with a dialkyl amino alkyl halide.

11. The method of claim 9, in which the etherification product is one resulting from the reaction of starch in an alkaline medium with a dialkyl amino alkyl epoxide.

References Cited in the file of this patent

UNITED STATES PATENTS

| Number | Name | Date |
|---|---|---|
| 2,138,296 | Hardy | Nov. 8, 1938 |
| 2,385,438 | Fowler et al. | Sept. 25, 1945 |
| 2,516,633 | Kesler et al. | July 25, 1950 |
| 2,680,072 | Marrone | June 1, 1954 |
| 2,733,238 | Kerr et al. | Jan. 31, 1956 |
| 2,813,093 | Caldwell et al. | Nov. 12, 1957 |